Nov. 20, 1923.

S. T. CAMPBELL 1,474,510

METHOD OF MAKING BATTERY JAR COVERS

Filed Nov. 17, 1921  2 Sheets-Sheet 1

INVENTOR.
Stanley T. Campbell
BY
Fay, Oberlin & Fay
ATTORNEYS

Nov. 20, 1923.

S. T. CAMPBELL 1,474,510

METHOD OF MAKING BATTERY JAR COVERS

Filed Nov. 17, 1921      2 Sheets-Sheet 2

INVENTOR.
Stanley T. Campbell.
BY
Fay Oberlin + Fay
ATTORNEYS

Patented Nov. 20, 1923.

1,474,510

UNITED STATES PATENT OFFICE.

STANLEY T. CAMPBELL, OF CLEVELAND, OHIO, ASSIGNOR TO THE AETNA RUBBER CO., OF CLEVELAND, OHIO, A CORPORATION OF OHIO.

METHOD OF MAKING BATTERY-JAR COVERS.

Application filed November 17, 1921. Serial No. 515,897.

*To all whom it may concern:*

Be it known that I, STANLEY T. CAMPBELL, a citizen of the United States, and a resident of Cleveland, county of Cuyahoga, and State of Ohio, have invented a new and useful Improvement in Methods of Making Battery-Jar Covers, of which the following is a specification, the principle of the invention being herein explained and the best mode in which I have contemplated applying that principle, so as to distinguish it from other inventions.

The present invention relates to battery jar covers and the method of making the same, and more particularly, it relates to a cover of hard rubber in which the openings for the lead posts of the battery are provided with soft rubber bushings so that the joint between the posts and the cover may be made leak-proof. The invention consists of forming the cover of the usual hard rubber, with the bushings or bearings of soft or resilient rubber, so that the finished article is a single unitary structure. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
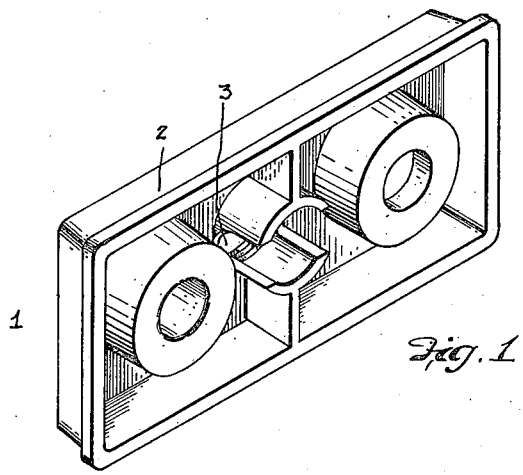
Figure 2:
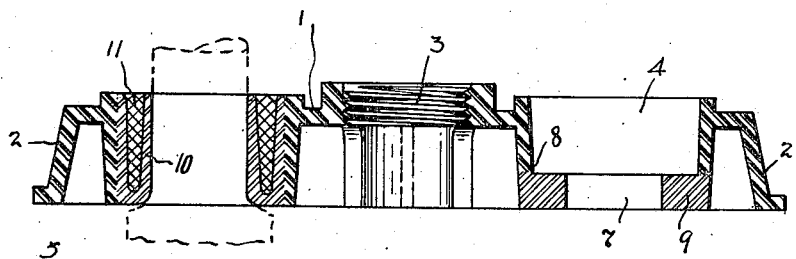
Figure 3:
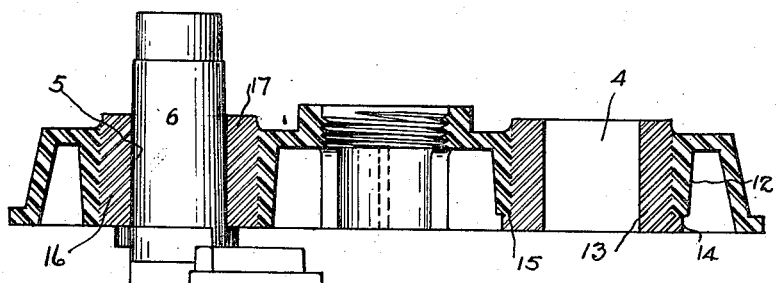
Figure 5:
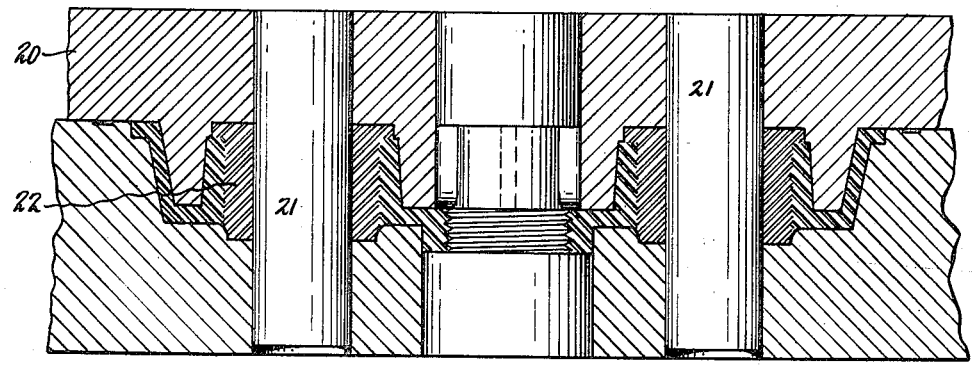
Figure 4:
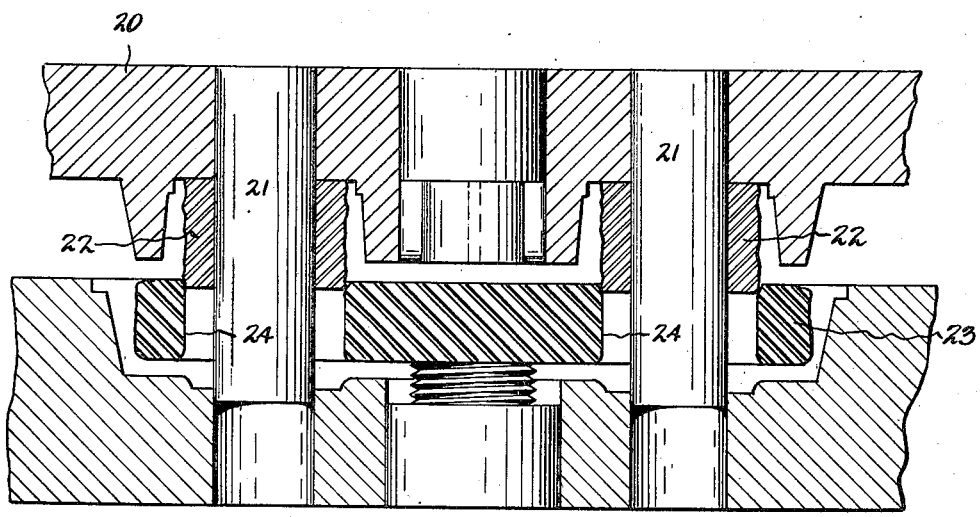

Fig. 1 is a perspective view of the bottom of a cover showing two forms of bushings in the two apertures for the posts; Fig. 2 is a section on the line 2—2 of Fig. 1; Fig. 3 is a section similar to Fig. 2 but showing modified forms of bushings; Fig. 4 is a sectional view through a mold showing the material in place before the mold is closed; and Fig. 5 is a sectional view through a similar mold when the mold has been closed.

As shown in Fig. 1, there is a cover 1 for a battery jar which has the usual depending outer flange 2 and which is provided with the usual threaded center opening 3 adapted to receive a screw-threaded cap for filling purposes. This cover is adapted to fit over a single battery jar or cell, and is therefor provided with two openings 4 and 5 to receive the lead contact posts 6 of the battery which are adapted to extend through the cover to be connected to lead wires in the usual way. As illustrated in the form shown in the right hand opening in Figs. 1 and 2, the opening 4 is made in the form of a cup which has a central aperture 7 in the bottom. Between the sides 8 of the cup and this central aperture, is an annular ring or bushing 9 of sufficient thickness to form a tight seal with the lead posts, and this ring is formed of soft or resilient rubber, while the rest of the cover is formed of hard rubber, but the ring is homogeneously united to the cover so as to form unitary structure. The post is forced through this rubber ring or bushing, and the cup above the bushing is then adapted to be filled with pitch or the like to secure the post in place.

In the form shown in the left hand aperture in Fig. 1, the cup is supplied with the U-shaped soft rubber bushing 10 which is integrally united to the cup throughout its outer periphery, the inside of the bushing being adapted to fit the posts snugly to form a leak-proof joint. To secure the post in place, a lead or other soft metal washer 11 is adapted to be forced down between the legs of the U and this washer is of sufficient thickness to bind the bushing securely against the post 6. In this construction the bushing is of the same depth as the cup and is homogeneously united thereto throughout its length.

In Fig. 3 there is a modified form of bushing shown at the right in which the cover is provided with a cup or downwardly extending cylindrical flange 12, and this flange is provided with a cylindrical bushing 13 of soft rubber which has an annular flange 14 at the bottom adapted to fit over the bottom surface 15 of the cup or cylindrical flange. This bushing is likewise homogeneously united to the cup so as to form an integral structure when finished. In the left hand opening in Fig. 3, the bushing is merely a straight cylinder 16 of such a length as to be flush with the top and bottom of the cup and the bushing 17 will be homogeneously united to the cup.

It is of course understood that the lead posts 6 must fit the jar cover snugly and where the jar cover is made of hard rubber, it is very easy to crack the cover in forcing the posts into position, particularly, if either the openings in the cover or the posts are not quite accurate in size. With the use of the present soft rubber bushings there is sufficient resiliency in the bushings themselves to allow a very tight fit to be obtained between the bushings and the post without any danger of breakage.

In making the present covers as illustrated in Figs. 4 and 5, the upper or male mold 20, is provided with pins 21 which form the openings through the cover for the contact posts and bushings 22 of unvulcanized soft rubber compound, are placed in position on these core pins. The usual prepared piece 23 of unvulcanized hard rubber compound is then placed in position in the female mold, this piece having apertures 24 into which the bushings may be forced as the molds are closed, thus forming the finished cover as shown in Fig. 5 with the bushings in place in the hard rubber compound. The whole is then vulcanized and the cover when finished, is as heretofore described.

The composition of the bushings must be such that it will be vulcanized into a soft or resilient cylinder during the same length of time that it takes to form the bar stock for the cover into a hard rubber article. The result is a jar cover which has a soft or resilient bushing around the apertures for the posts, which bushing is an integral part of the cover. There is no definite line of cleavage between the bushing and the rest of the cover as they are vulcanized together, and it is merely the difference in composition that keeps the bushings soft while forming the cover hard. One vulcanizing operation is sufficient, and the parts are not preformed in the finished way and then vulcanized together, but are both formed of unvulcanized gum and are then vulcanized together in a single operation.

Other forms may be employed embodying the features of my invention instead of the one here explained, change being made in the form or construction, provided the elements stated by any of the following claims or the equivalent of such stated elements be employed, whether produced by my preferred method or by others, embodying steps equivalent to those stated in the following claims.

I therefore particularly point out and distinctly claim as my invention:—

1. The method of making battery jar covers comprising the fitting of bushings of soft rubber compounds about the pins in the mold for forming the openings for the contact posts, inserting a piece of hard rubber compound in the mold and forcing the mold plates together under heat and pressure to form an integral cover having soft rubber bushings.

2. The method of making battery jar covers comprising the fitting of bushings of soft rubber compounds about the pins in the mold for forming the openings for the contact posts, inserting a piece of hard rubber compound in the mold, said piece having openings to receive the bushings, forcing the molds together under heat and pressure to flow the material to form a cover having soft rubber bushings integral with the hard rubber cover.

Signed by me this 15th day of November, 1921.

STANLEY T. CAMPBELL.